US012136788B2

(12) United States Patent
Fertig et al.

(10) Patent No.: US 12,136,788 B2
(45) Date of Patent: Nov. 5, 2024

(54) SHIELDING SPRING CONTACT, PLUG-IN CONNECTOR COMPRISING A SHIELDING SPRING CONTACT, AND PLUG-IN CONNECTOR SYSTEM COMPRISING A SHIELDING SPRING CONTACT

(71) Applicant: TE Connectivity Germany GmbH, Bensheim (DE)

(72) Inventors: Jochen Fertig, Bensheim (DE); Maximilian Veihl, Bensheim (DE); Martin Listing, Bensheim (DE); Christoph Kosmalski, Bensheim (DE); Uemit Bulduk, Bensheim (DE); Eike Luellich, Bensheim (DE); Kevin Scheer, Bensheim (DE); Ivan Ivanov, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 327 days.

(21) Appl. No.: 17/591,284

(22) Filed: Feb. 2, 2022

(65) Prior Publication Data

US 2022/0255267 A1 Aug. 11, 2022

(30) Foreign Application Priority Data

Feb. 5, 2021 (DE) ......................... 102021102778.0

(51) Int. Cl.
*H01R 13/6581* (2011.01)

(52) U.S. Cl.
CPC ..... *H01R 13/6581* (2013.01); *H01R 2201/26* (2013.01)

(58) Field of Classification Search
CPC ............ H01R 13/6851; H01R 13/6583; H01R 13/6582; H01R 13/6584; H01R 24/38; H01R 2201/26

(Continued)

(56) References Cited

U.S. PATENT DOCUMENTS 4,012,105 A 3/1977 Biddle
5,618,190 A 4/1997 Masuda et al.

(Continued)

FOREIGN PATENT DOCUMENTS

DE 19822015 A1 11/1998
EP 2200130 A1 * 6/2010 ......... H01R 13/5221

(Continued)

OTHER PUBLICATIONS

Office Action from the Japanese Patent Office dated Feb. 28, 2023 (with English translation thereof), corresponding to Application No. 2022-014721, 8 pages.

(Continued)

*Primary Examiner* — Peter G Leigh
(74) *Attorney, Agent, or Firm* — Barley Snyder

(57) ABSTRACT

A shielding spring contact includes a flat base portion having a top side and a cutout, and a shielding portion having a wall connected to the flat base portion and encircling the cutout. The wall has an outer side, an inner side, an upper side, and a lower side. The lower side of the wall is arranged on the top side of the flat base portion with the lower side of the wall laterally surrounding the cutout. The top side of the flat base portion bears against a bottom side of an assembly housing portion of a first plug-in connector and the shielding portion projects through a first passage opening in the assembly housing portion. The shielding portion projects through a second passage opening in a shielding housing wall and into a shielding housing of a second plug-in connector, bearing against the shielding housing wall.

17 Claims, 5 Drawing Sheets

(58) Field of Classification Search
USPC .................................................... 439/607.55
See application file for complete search history.

(56) References Cited

U.S. PATENT DOCUMENTS

| | | | | |
|---|---|---|---|---|
| 6,066,001 | A * | 5/2000 | Liptak ................ | H01R 13/6582 439/607.17 |
| 6,380,483 | B1 * | 4/2002 | Blake ................... | H02G 3/0691 439/98 |
| 6,957,968 | B1 * | 10/2005 | Gretz ................. | H01R 13/6583 174/661 |
| 7,060,900 | B1 * | 6/2006 | Gretz ................... | H02G 15/013 174/152 G |
| 7,476,817 | B1 * | 1/2009 | Shemtov .............. | H02G 3/0691 174/661 |
| 8,506,325 | B2 | 8/2013 | Malloy et al. | |
| 2008/0053680 | A1 * | 3/2008 | Kiely ................... | H02G 3/0683 174/70 R |
| 2017/0141503 | A1 * | 5/2017 | Eckel ..................... | H01R 13/18 |

FOREIGN PATENT DOCUMENTS

| | | | | |
|---|---|---|---|---|
| EP | 2843774 | A1 * | 3/2015 | ......... H01R 13/6582 |
| EP | 3859906 | A1 | 8/2021 | |
| JP | 2020047369 | A * | 3/2020 | |
| WO | WO-2014108171 | A1 * | 7/2014 | ......... H01R 13/6582 |

OTHER PUBLICATIONS

Extended European Search Report, Application No. 22154892.8-1201, Dated: Jun. 22, 2022, 12 pages.

German Office Action, App No. 10 2021 102 778.0, dated Sep. 30, 2021, 5 pages.

* cited by examiner

SHIELDING SPRING CONTACT, PLUG-IN CONNECTOR COMPRISING A SHIELDING SPRING CONTACT, AND PLUG-IN CONNECTOR SYSTEM COMPRISING A SHIELDING SPRING CONTACT

CROSS-REFERENCE TO RELATED APPLICATIONS

This application claims the benefit of the filing date under 35 U.S.C. § 119(a)-(d) of German Patent Application No. 102021102778.0, filed on Feb. 5, 2021.

FIELD OF THE INVENTION

The present invention relates to a shielding spring contact, to a plug-in connector comprising a shielding spring contact, and to a plug-in connector system comprising a shielding spring contact.

BACKGROUND

Plug-in connector systems which have a shielding system configured to allow shielding currents to flow are known from the prior art. Shielding currents can be capacitively or inductively coupled into a shield when high-frequency electric currents flow through an electrical conductor.

If a first plug-in connector of a plug-in connector system is integrated, for example, into a conductive housing of an assembly, shielding currents can be conducted to a housing wall of the housing. For this purpose, the housing wall typically has a hollow-cylindrical dome which is arranged in the region around a cutout in the housing wall. Such a dome on the housing wall can be produced by a die-casting process. The dome is intended to shield an electrical conductor arranged in the cutout and to divert shielding currents. In addition to complicated production of the housing, it may additionally be necessary for the dome to have to be processed for the purpose of safe electrical contact-connection between the dome and a shielding structure of the second plug-in connector.

SUMMARY

A shielding spring contact includes a flat base portion having a top side and a cutout, and a shielding portion having a wall connected to the flat base portion and encircling the cutout. The wall has an outer side, an inner side, an upper side, and a lower side. The lower side of the wall is arranged on the top side of the flat base portion with the lower side of the wall laterally surrounding the cutout. The top side of the flat base portion bears against a bottom side of an assembly housing portion of a first plug-in connector and the shielding portion projects through a first passage opening in the assembly housing portion. The shielding portion projects through a second passage opening in a shielding housing wall and into a shielding housing of a second plug-in connector, bearing against the shielding housing wall.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
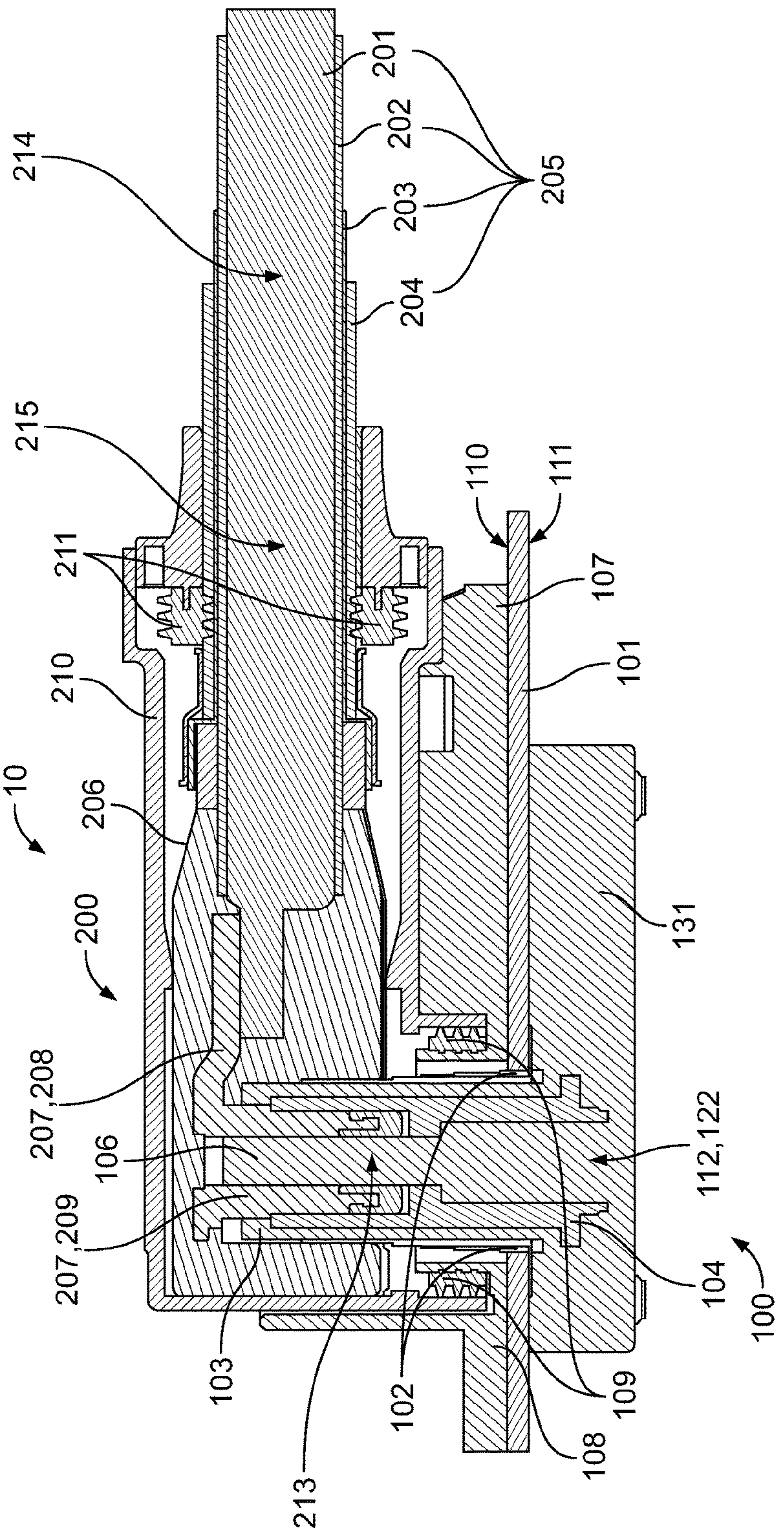
FIG. 1 is a sectional side view of a plug-in connector system according to an embodiment.

The invention shall be explained hereafter in more detail by way of example using embodiments with reference to the drawings. The feature combinations illustrated in the embodiments by way of example can be supplemented by further features according to the explanations herein, in accordance with the properties of the electrical plug device of the invention that are required for a specific application. Individual features can also be omitted in the embodiments described if the effect of this feature is irrelevant for a specific case of application. The same reference numerals in the drawings are used for elements having the same function and/or the same structure.

FIG. 1 shows a diagrammatic cross-sectional view through a plug-in connector system 10. The plug-in connector system 10 can be configured, for example, as a high-voltage plug-in connection and can be, for example, a constituent part of a motor vehicle, for example of an electric vehicle or of a hybrid vehicle, but other applications are also possible.

The plug-in connector system 10 has a first plug-in connector 100 and a second plug-in connector 200 which are plugged together in the plug-in connector system 10. The first plug-in connector 100 is configured as a socket. The second plug-in connector 200 is configured as a plug. The second plug-in connector 200 is, by way of example, of angled configuration, as a result of which the plug-in connector system 10 is also of angled configuration. However, the second plug-in connector 200 can also be of straight configuration. The plug-in connector system 10 can have any desired number of poles. The view in FIG. 1 therefore shows the cross-sectional view through one pole of the plug-in connector system 10.

The second plug-in connector 200 has a second electrical conductor 201, as shown in FIG. 1. The second electrical conductor 201 can contain any desired metal, for example copper. The second electrical conductor 201 can be configured as an individual strand or contain a large number of strands which can be twisted together, for example. The second electrical conductor 201 is embedded into a first insulation 202. The first insulation 202 contains a dielectric plastic. A shield 203 is arranged on the first insulation 202. The shield 203 contains a metal, for example tin-plated copper, and is intended to shield the second electrical conductor 201. The shield 203 can be configured as a shielding braid for example. The second electrical conductor 201 and the shield 203 are arranged concentrically. In a plane running perpendicular to the sectional plane of FIG. 1, the second electrical conductor 201 has a circular cross section and the shield 203 has an annular cross section. However, the second electrical conductor 201 and the shield 203 can also be shaped differently. A second insulation 204, which likewise contains a dielectric plastic, is arranged on the shield 203. The first and the second insulation 202, 204 can contain, for example, polyvinyl chloride (PVC), polyethylene (PE), rubber or polyurethane (PUR). The second conductor 201, the first insulation 202, the shield 203 and the second insulation 204 form a cable 205.

The second plug-in connector 200 has a second contact structure 207, as shown in FIG. 1. The second contact structure 207 contains a metal. The second contact structure 207 has a connecting portion 208 which is electrically and mechanically connected to the second electrical conductor 201. The second contact structure 207 further has a contact portion 209 electrically and mechanically connected to the connecting portion 208, wherein the portions 208, 209 of the second contact structure 207 can be monolithically connected to one another; in an embodiment, the second contact structure 207 can be configured in one piece. The contact portion 209 is configured, by way of example, as a contact sleeve. However, the contact portion 209 can also be configured as a contact pin.

As shown in FIG. 1, the second plug-in connector 200 has a housing 210. The cable 205 projects into the housing 210. The housing 210 can contain a plastic, for example. The second plug-in connector 200 further has a shielding housing 206 which contains a metal, for example a copper alloy such as brass, or steel for example. The shielding housing 206 is arranged within the housing 210. The shielding housing 206 is electrically and mechanically connected to the shield 203. The cable 205 projects through a first opening 214 in the housing 210 into the housing 210. A second seal 211 is arranged in the region of the first opening 214 and seals off a region between the housing 210 and the cable 205. The second electrical conductor 201 of the cable 205 projects through a second opening 215 in the shielding housing 206 into the shielding housing 206. The second contact structure 207 is arranged in the shielding housing 206.

The first plug-in connector 100 has an assembly housing portion 101 and a shielding spring contact 102 shown in FIG. 1. The shielding spring contact 102 is electrically connected to the assembly housing portion 101. In the plug-in connector system 10, the shielding spring contact 102 is electrically connected to the shielding housing 206. The assembly housing portion 101 and the shielding spring contact 102 of the first plug-in connector 100 form, together with the shielding housing 206 of the second plug-in connector 200 and the shield 203, a shielding system 11 of the plug-in connector system 10.

Figure 2:
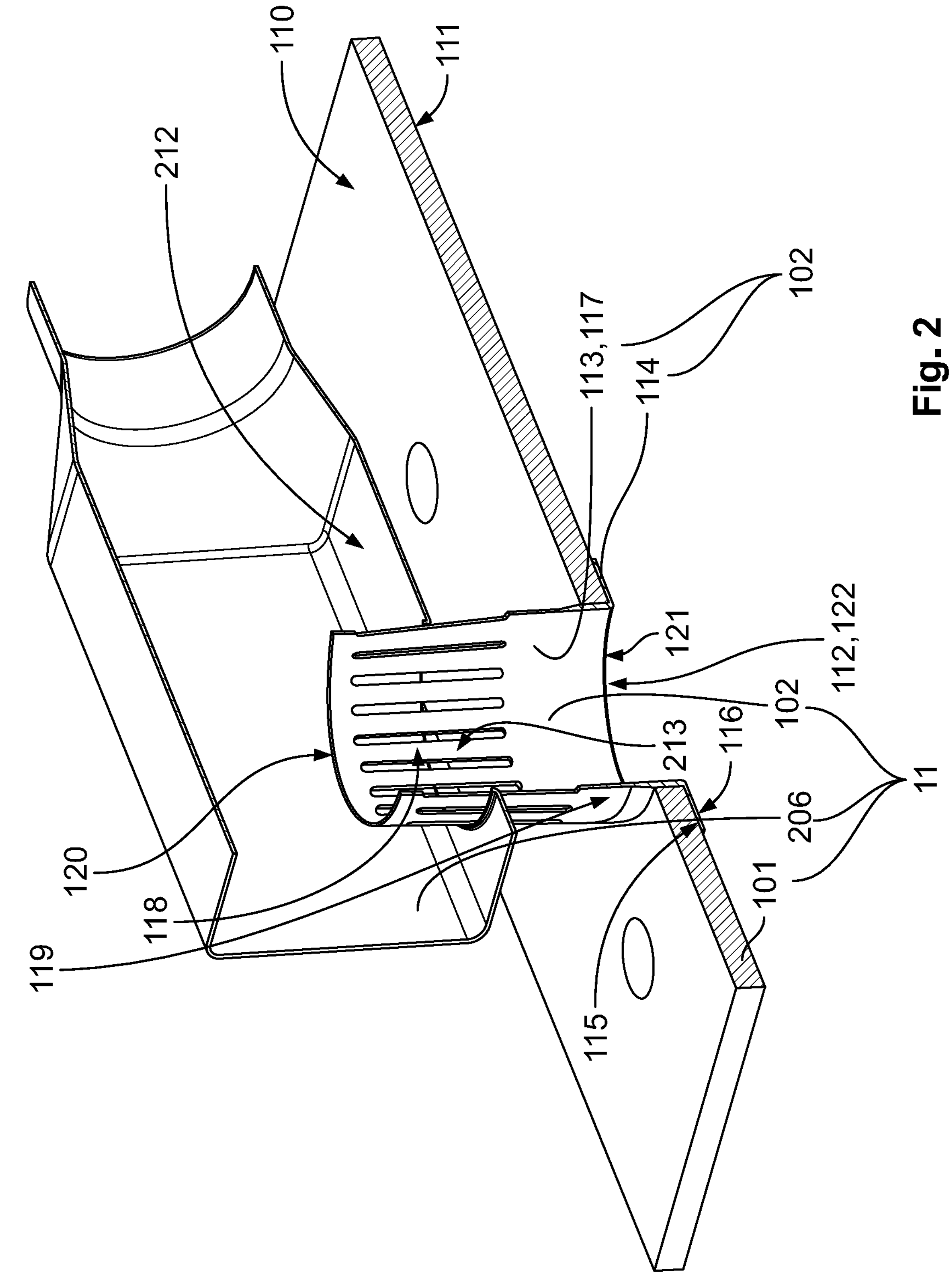
FIG. 2 is a sectional perspective view through a shielding system of the plug-in connector system of FIG. 1.

FIG. 2 diagrammatically shows a perspective cross-sectional view through the shielding system 11 of the plug-in connector system 10 of FIG. 1. Other constituent parts of the plug-in connector system 10 and the shield 203 of the shielding system 11 are not illustrated in FIG. 2 for reasons of clarity.

The assembly housing portion 101 has a first top side 110 and a first bottom side 111 situated opposite the first top side 110, as shown in FIGS. 1 and 2. Furthermore, the assembly housing portion 101 has a first passage opening 112. The shielding spring contact 102 has a flat base portion 114 and a shielding portion 113. The flat base portion 114 has a second top side 115, a bottom side 116 situated opposite the second top side 115, and a cutout 122. The shielding spring contact 102 bears, by way of the second top side 115 of the base portion 114, against the first bottom side 111 of the assembly housing portion 101 and in this way is electrically connected to the assembly housing portion 101.

The shielding portion 113 of the shielding spring contact 102 has a wall 117 connected to the base portion 114, as shown in FIG. 2, and encircling the cutout 122. The wall 117 has an outer side 119, an inner side 118, an upper side 120 and a lower side 121. The wall 117 is arranged, by way of its lower side 121, on the second top side 115 of the base portion 114 in such a way that the lower side 121 of the wall 117 laterally surrounds the cutout 122 in the base portion 114. The shielding portion 113 of the shielding spring contact 102 projects through the first passage opening 112 in the assembly housing portion 101. In the region of the first passage opening 112, the shielding portion 113 bears, by way of the outer side 119 of its wall 117, against the assembly housing portion 101.

As shown in FIG. 2, the shielding housing 206 of the second plug-in connector 200 has a shielding housing wall 212 with a second passage opening 213 facing the assembly housing portion 101. In the shielding system 11 of the plug-in connector system 10, the shielding portion 113 projects through the second passage opening 213 in the shielding housing wall 212 into the shielding housing 206 and, in the region of the second passage opening 213, bears, by way of the outer side 119 of its wall 117, against the shielding housing wall 212, as a result of which the shielding portion 113 is electrically connected to the shielding housing 206. In this case, the wall 117 is configured in a manner running obliquely with respect to the shielding housing wall 212.

The plug-in connector system 10 is explained below with reference to FIG. 1. The first plug-in connector 100 has a header 131. The header 131 contains at least one plastic, for example. The header 131 has a portion which bears both against the first bottom side 111 of the assembly housing portion 101 and against the second bottom side 116 of the base portion 114 of the shielding spring contact 102. In addition, the header 131 has a portion 103 which projects through the first passage opening 112 in the assembly housing portion 101 and bears against the inner side 118 of the wall 117 of the shielding portion 113. The portion 103, projecting through the first passage opening 112, of the header 131 projects, by way of example, beyond the wall 117 of the shielding portion 113 in the illustration of FIG. 1.

The first plug-in connector 100 has a first contact structure 104 shown in FIG. 1. The first contact structure 104 contains a metal and is configured, merely by way of example, as a double sleeve. The first contact structure 104 of the first plug-in connector 100 projects through the first passage opening 112 in the assembly housing portion 101. In the plug-in connector system 10, the first contact structure 104 projects into the shielding housing 206 of the second plug-in connector 200. The first contact structure 104 bears, by way of an outer side, against an inner side of the portion 103 of the header 131.

The first contact structure 104 is electrically and mechanically connected to the second contact structure 207 in the plug-in connector system 10. In the exemplary embodiment of the plug-in connector system 10 of FIG. 1, the second contact structure 207, configured as a contact sleeve, of the second plug-in connector 200 projects at one end into the first contact structure 104, configured as a double sleeve, of the first plug-in connector 100. In this way, the first contact structure 104 is electrically connected to the second electrical conductor 201 of the second plug-in connector 200.

For the purpose of fixing the first contact structure 104, the header 131 has a further portion 106 shown in FIG. 1 which likewise projects through the first passage opening 112 in the assembly housing portion 101. This further portion 106 projects through the first contact structure 104 and bears against an inner side of the first contact structure 104. In this way, the first contact structure 104 is stabilized in the first plug-in connector 100. The further portion 106 also projects, by way of example, into the second contact structure 207 configured as a sleeve. In this way, the connection comprising the first contact structure 104 and the second contact structure 207 is fixed and stabilized.

The first plug-in connector 100 can have a first electrical conductor which is electrically and mechanically connected to the first contact structure 104. The first electrical conductor is not illustrated in FIG. 1 for reasons of simplicity. The first electrical conductor can be arranged on a side of the first contact structure 104 averted from the second contact structure 207. In this way, the first electrical conductor 105, the first contact structure 104, the second contact structure 207 and the second electrical conductor 201 are electrically connected to one another in the plug-in connector system 10.

The header 131 has an attachment 107, shown in FIG. 1, arranged above the assembly housing portion 101. A seal 109 is arranged in a region around the shielding spring contact 102. The seal 109 is configured to seal off a region between the housing 210 of the second plug-in connector 200 and the attachment 107 of the first plug-in connector 100. In addition, the attachment 107 can also have structures for receiving and fixing the housing 210 of the second plug-in connector 200. In this way, the first plug-in connector 100 and the second plug-in connector 200 are securely connected to one another.

The first plug-in connector 100 can be integrated, for example, into an assembly housing of an electrical assembly, wherein the assembly housing portion 101 is a constituent part of a wall of the assembly housing. However, the first plug-in connector 100 can also be configured, for example, as a connector strip which can be fitted, for example, to the assembly housing. In this case, the first plug-in connector 100 can be fixed, by way of the assembly housing portion 101, to a wall of the assembly housing. In both cases, shielding currents can flow away across the assembly housing portion 101 to the assembly housing.

The shielding system 11 of the plug-in connector system 10 is configured to electromagnetically shield the first electrical conductor 105, the first contact structure 104 and the second contact structure 207. The second electrical conductor 201 is shielded by the shield 203 of the cable 205. The shielding spring contact 102 of the first plug-in connector 100 is intended to shield a transition region between the assembly housing portion 101 of the first plug-in connector 100 and the shielding housing 206 of the second plug-in connector. In this case, the wall 117 of the shielding portion 113 of the shielding spring contact 102 is configured to shield the first contact structure 104 in the region between the assembly housing portion 101 and the shielding housing 206.

If a voltage is applied to the system comprising the first electrical conductor 105, the first contact structure 104, the second contact structure 207 and the second electrical conductor 201, shielding currents can be capacitively and/or inductively coupled into the shield 203, the shielding housing 206 and the wall 117 of the shielding spring contact 102. The shielding currents can advantageously flow away across the wall 117 of the shielding spring contact 102 and across its base portion 114 to the assembly housing portion 101, as a result of which an interfering influence of the shielding currents can be avoided.

Figure 3:
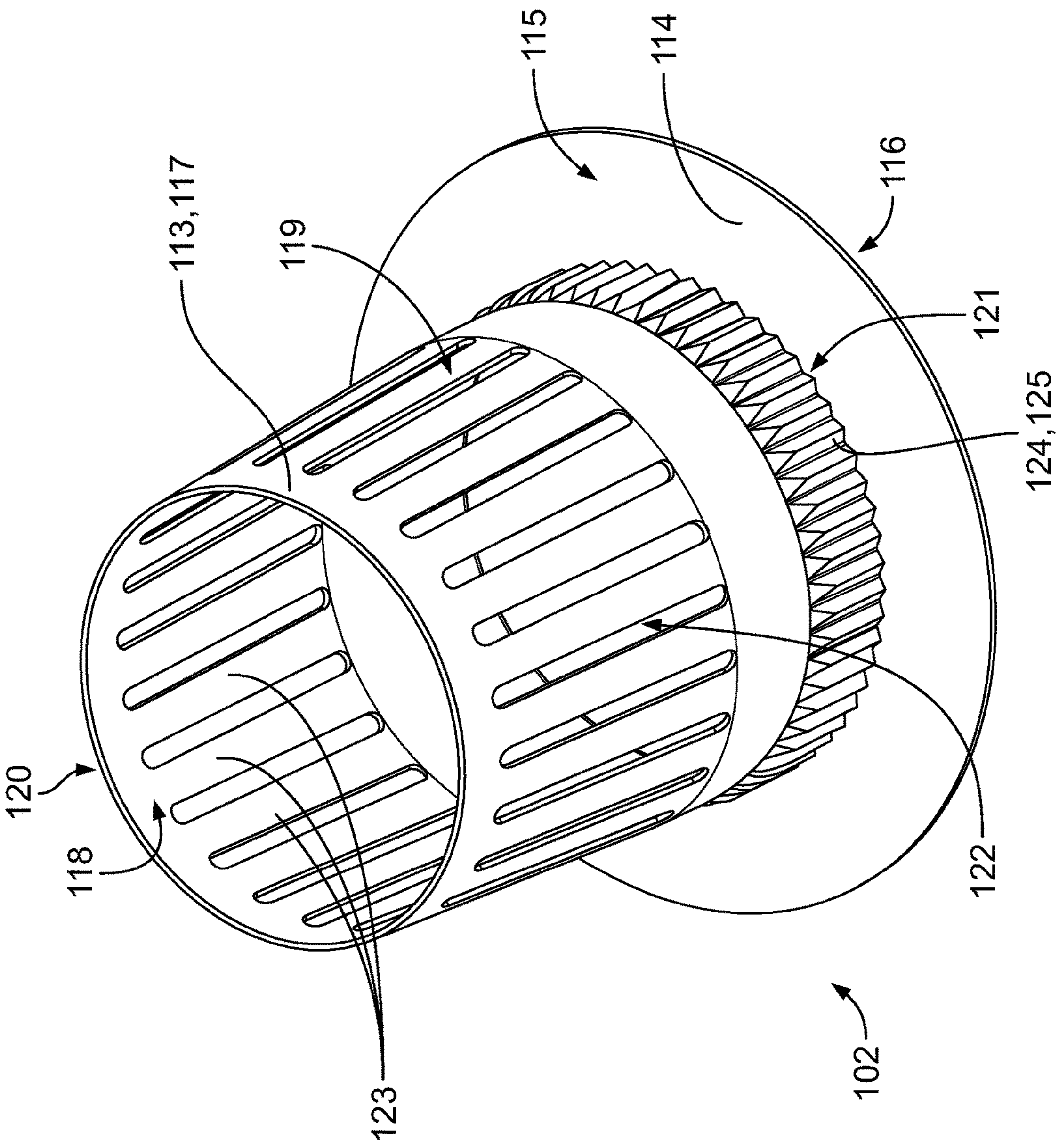
FIG. 3 is a perspective view of a shielding spring contact of the shielding system of FIG. 2.

FIG. 3 diagrammatically shows a perspective view of the shielding spring contact 102 of the first plug-in connector 100 and, respectively, of the plug-in connector system 10 of FIG. 1. The shielding spring contact 102 can be produced, for example, by a deep-drawing process from a metal sheet.

The base portion 114 is of annular disc-like configuration by way of example. As an alternative, the base portion 114 can also comprise a plurality of annular disc segments which are securely connected to the wall 117. The shielding spring contact 102 is of conical or hollow truncated cone-like configuration at least in portions. In this case, the wall 117 tapers in a direction away from the base portion 114, as shown in FIG. 3. The shielding spring contact 102 of conical form at least in portions has the advantage that it causes a wedging effect in the first plug-in connector 100 and, respectively, in the plug-in connector system 10, as a result of which the shielding spring contact can be electrically and mechanically connected to the assembly housing portion 101 and the shielding housing wall 212 of the shielding housing 206 in a reliable manner. However, the wall 117 of the shielding spring contact 102 does not necessarily have to be of conical configuration in portions. The shielding spring contact 102 can also be of entirely hollow-cylindrical configuration for example.

A fixing structure 124 is arranged on the outer side 119 of the wall and in the region of the lower side 121. In FIG. 3, the fixing structure 124 is embodied, by way of example, as a toothing 125. In this case, a plurality of teeth are arranged on the outer side 119 of the wall 117, in the region of the lower side 121 and encircling the wall 117. In the first plug-in connector 100 and, respectively, in the plug-in connector system 10, the toothing 125 causes the shielding spring contact 102 and the assembly housing portion 101 to be reliably connected to one another since the toothing 125 is configured to become wedged in the assembly housing portion 101 in the region of the first passage opening 112, as a result of which the shielding spring contact 102 and the assembly housing portion 101 are particularly robustly mechanically and electrically connected to one another. However, the fixing structure 124 does not necessarily have to be embodied as a toothing 125. The fixing structure 124 can also be entirely dispensed with.

The wall 117 of the shielding spring contact according to FIG. 3 is, at least in portions, of slotted configuration along a direction running perpendicular to the base portion 114. As a result, the wall 117 has, at least in portions, webs 123 which are arranged along the direction running perpendicular to the base portion 114 and around the wall 117. As a result, the shielding spring contact 102 can be of more flexible and more elastic configuration. The webs 123 in the wall 117 can be produced, for example, by a punching process. However, the wall 117 does not have to be of slotted configuration.

Figure 4:
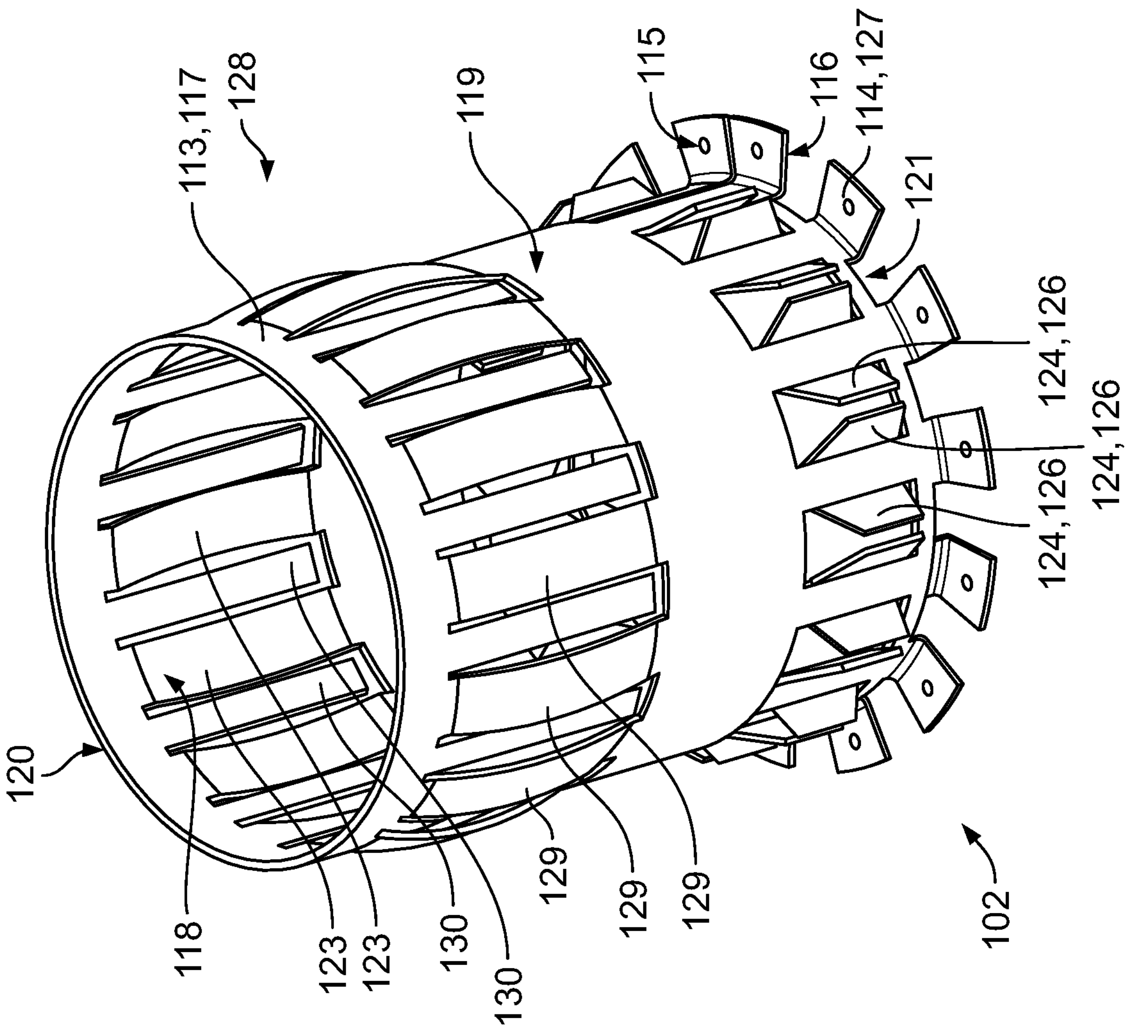
FIG. 4 is a perspective view of a shielding spring contact according to another embodiment.

FIG. 4 diagrammatically shows a perspective view of a shielding spring contact 102 according to a further embodiment. The shielding spring contact 102 of FIG. 4 represents an alternative embodiment for the first plug-in connector 100 and, respectively, the first plug-in connector system 10. The shielding spring contacts 102 of FIG. 3 and FIG. 4 have similarities. Similar and identical elements of the shielding spring contacts 102 are provided with the same reference signs. Only the differences in the shielding spring contacts 102 are explained in the following description. Notwithstanding the differences, the description of the shielding spring contact 102 of FIG. 3 also applies to the shielding spring contact 102 of FIG. 4.

The shielding spring contact 102 of FIG. 4 is of hollow-cylindrical, and not conical, configuration. The shielding spring contact 102 of FIG. 4 also has a fixing structure 124. However, the fixing structure 124 is not configured as a toothing 125, but rather has fins 126 which are arranged on the outer side 119 of the wall 117 and project obliquely away from the wall 117.

In contrast to the shielding spring contact 102 of FIG. 3, the shielding spring contact 102 of FIG. 4 does not have a base portion 114 of annular disc-like configuration, but rather a base portion 114 which comprises annular disc segments 127 which are connected to the wall 117. The shielding spring contact 102 of FIG. 4 can be produced, for example, by a punching process in combination with a shaping process. After a metal is punched, it can be shaped, for example, by a cylindrically or alternatively conically shaped drum in such a way that an encircling wall 117 is created.

The punching process can also comprise punching the fins 126 shown in FIG. 4. The fins 126 can then be reshaped in such a way that they project obliquely outwards from the wall 117. The punching process can also comprise punching the webs 123. In the exemplary embodiment of FIG. 4, the shielding spring contact 102 also has, in addition to the webs 123, further webs 130 which can likewise be produced by punching. The further webs 130 are securely connected to the wall 117 only on a side facing the upper side 120 of the wall 117. On the contrary, the further webs 130 are not connected to the wall 117 on a side facing the lower side 121. However, the webs 123 and further webs 130 can also be dispensed with.

The shielding spring contact 102 of FIG. 4 has a curved portion 128 in the region between the upper side 120 and the lower side 121. The shielding spring contact 113 is therefore of widened configuration at least in portions in the region between the upper side 120 and the lower side 121 and has an increased diameter within this region. The shielding spring contact 102 of FIG. 2 can also have such a curved or widened portion 128. Merely by way of example, the curved portion 128 is of encircling configuration. The curved or widened portion 128 can make it possible to improve electrical and mechanical contact between the shielding portion 113 and the shielding housing 206. The curved portion 128 can also be dispensed with.

The shielding portion 133 of the shielding spring contact 102 of FIG. 4 comprises a metal coating 129. The metal coating 129 is arranged, at least in portions, on the outer side 119 of the wall 117, for example by an electromechanical process or by roll cladding. In an embodiment, the metal coating 129 is arranged in the region of the webs 123 and in the region of the curved portion 128. For example, the metal coating 129 can also be arranged on the further webs 130 and/or outside the webs 123 or outside the further webs 130 on the outer side 119 of the wall 117. The metal coating 129 can contain, for example, silver or gold or another metal and is intended to additionally improve the electrical and mechanical contact between the shielding portion 113 and the shielding housing 206. The shielding spring contact 102 of FIG. 3 can also have a metal coating 129 which can likewise be arranged in the region of a curved portion 128 or in another region on the outer side 119 of the wall 117. The metal coating 129 can also be dispensed with.

Figure 5:
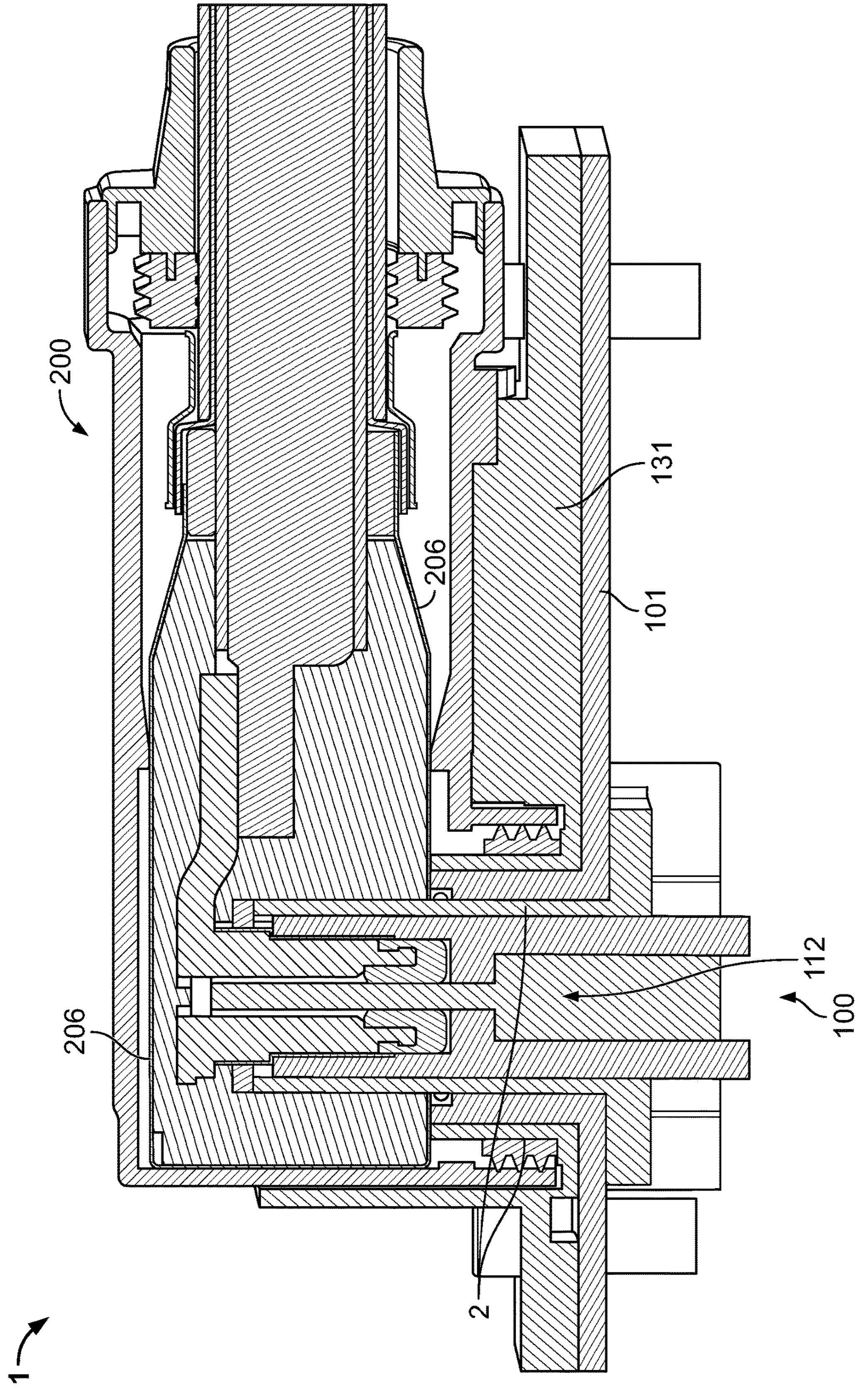
Fig. 5 PRIOR ART
FIG. 5 is a sectional side view of a plug-in connector system according to the prior art.

FIG. 5 diagrammatically shows a cross-sectional view through a plug-in connector system 1 according to the prior art. In contrast to the plug-in connector system 10 of FIG. 1, the known plug-in connector system 1 does not have a shielding spring contact 102. Instead, the plug-in connector system 1 has a dome 2. The dome 2 and the assembly housing portion 101 are monolithically connected to one another in the known plug-in connector system 1. The dome 2 is of hollow-cylindrical configuration, arranged on the first top side 110 of the assembly housing portion 101 and laterally surrounds the first passage opening 112 in the assembly housing portion 101. The dome 2 is electrically and mechanically connected to the shielding housing 206 of the second plug-in connector 200. Due to the assembly housing portion 101 and the dome 2 being configured in one piece, a method for producing the assembly housing portion 101 is relatively complicated. Furthermore, it may be the case that the dome 2 additionally has to be processed in order to be able to ensure electrical contact-connection with the shielding housing 206

In comparison to this, the shielding spring contact 102 of the present invention renders possible relatively simple production of the assembly housing portion 101 and therefore also relatively simple production of the first plug-in connector 100 and, respectively, of the plug-in connector system 10. In addition, an extremely wide variety of embodiments of the shielding spring contact 102, which have been explained above, can have a range of further advantageous technical effects.

Therefore, the concept of the plug-in connector system 10 according to FIG. 1 is substantially afforded by the shielding system 11 according to FIG. 2, wherein the shielding system 11 has a shielding spring contact 102 according to FIG. 3 or FIG. 4 which is plugged together with the assembly housing portion 101. For this reason, the plug-in connector system 10 and, respectively, the first plug-in connector 100 are to be understood in such a way that elements of the first plug-in connector 100 and, respectively, of the plug-in connector system 10 which are not included in the shielding system 11 can be dispensed with or else can be configured in some other way. For example, the first contact structure 104, the second contact structure 207 and the header 131 can also be shaped and configured differently. A latching-in mechanism of the plug-in connector system 10 can also be configured differently to the way shown in FIG. 1. For this purpose, for example, the housing 210 of the second plug-in connector 200 and the attachment 107 of the first plug-in connector 100 can be shaped and configured differently and have an extremely wide variety of latching-in and holding devices known to a person skilled in the art.

What is claimed is:

1. A plug-in connector system, comprising:

a first plug-in connector having an assembly housing portion and a shielding spring contact connected to the assembly housing portion, the assembly housing portion has a bottom side and a first passage opening, the shielding spring contact has a flat base portion and a shielding portion, the flat base portion has a top side and a cutout, the shielding portion has a wall connected to the flat base portion and encircling the cutout, the wall has an outer side, an inner side, an upper side, and a lower side, the lower side of the wall is arranged on the top side of the flat base portion with the lower side of the wall laterally surrounding the cutout; and a second plug-in connector having a shielding housing connected to shielding spring contact, the shielding housing has a shielding housing wall with a second passage opening facing the assembly housing portion, the shielding spring contact bears, by way of the top side of the flat base portion, against the bottom side of the assembly housing portion, the shielding portion of the shielding spring contact projects through the first passage opening in the assembly housing portion and projects through the second passage opening in the shielding housing wall into the shielding housing, the shielding portion bears against the shielding housing wall in a region of the second passage opening.

2. The plug-in connector system of claim 1, wherein the wall of the shielding spring contact has a conical configuration at least in portions.

3. The plug-in connector system of claim 2, wherein the wall of the shielding spring contact tapers in a direction away from the flat base portion.

4. The plug-in connector system of claim 1, further comprising a metal coating arranged on the outer side of the wall.

5. The plug-in connector system of claim 1, wherein the shielding portion is widened in a region between the upper side and the lower side.

6. The plug-in connector system of claim 5, wherein a metal coating is arranged in a widened portion of the shielding portion.

7. The plug-in connector system of claim 1, further comprising a fixing structure arranged on the outer side of the wall.

8. The plug-in connector system of claim 7, wherein the fixing structure is arranged in a region of the lower side of the wall.

9. The plug-in connector system of claim 1, wherein the wall has a slotted configuration along a direction extending perpendicular to the flat base portion.

10. The plug-in connector system of claim 1, wherein the flat base portion has an annular disc-like configuration.

11. The plug-in connector system of claim 1, wherein the flat base portion has a plurality of annular disc segments.

12. The plug-in connector system of claim 1, wherein the second plug-in connector is plugged together with the first plug-in connector.

13. A first plug-in connector, comprising:

an assembly housing portion having a bottom side and a first passage opening; and a shielding spring contact connected to the assembly housing portion, the shielding spring contact has a flat base portion and a shielding portion, the flat base portion has a top side and a cutout, the shielding portion has a wall connected to the flat base portion and encircling the cutout, the wall has an outer side, an inner side, an upper side, and a lower side, the lower side of the wall is arranged on the top side of the flat base portion with the lower side of the wall laterally surrounding the cutout, the shielding spring contact bears, by way of the top side of the flat base portion, against the bottom side of the assembly housing portion, the shielding portion of the shielding spring contact projects through the first passage opening in the assembly housing portion, the shielding portion projects into a shielding housing of a second plug-in connector.

14. The first plug-in connector of claim 13, wherein the shielding portion bears against a shielding housing wall of the shielding housing.

15. A shielding spring contact, comprising:

a flat base portion having a top side and a cutout; and a shielding portion having a wall connected to the flat base portion and encircling the cutout, the wall has an outer side, an inner side, an upper side, and a lower side, the lower side of the wall is arranged on the top side of the flat base portion with the lower side of the wall laterally surrounding the cutout, the top side of the flat base portion bears against a bottom side of an assembly housing portion of a first plug-in connector, the shielding portion projects through a first passage opening in the assembly housing portion.

16. The shielding spring contact of claim 15, wherein the shielding portion projects through a second passage opening in a shielding housing wall and into a shielding housing of a second plug-in connector.

17. The shielding spring contact of claim 16, wherein the shielding portion bears against the shielding housing wall in a region of the second passage opening.

* * * * *